United States Patent
Lee et al.

(10) Patent No.: US 11,912,909 B2
(45) Date of Patent: Feb. 27, 2024

(54) ACRYLIC EMULSION PRESSURE SENSITIVE ADHESIVE COMPOSITION

(71) Applicant: LG Chem, Ltd., Seoul (KR)

(72) Inventors: Yong Man Lee, Daejeon (KR); Jin Young Ryu, Daejeon (KR)

(73) Assignee: LG Chem, Ltd. (KR)

( * ) Notice: Subject to any disclaimer, the term of this patent is extended or adjusted under 35 U.S.C. 154(b) by 201 days.

(21) Appl. No.: 17/290,914

(22) PCT Filed: Jul. 29, 2020

(86) PCT No.: PCT/KR2020/010010
§ 371 (c)(1),
(2) Date: May 3, 2021

(87) PCT Pub. No.: WO2021/045391
PCT Pub. Date: Mar. 11, 2021

(65) Prior Publication Data
US 2021/0388239 A1    Dec. 16, 2021

(30) Foreign Application Priority Data

Sep. 3, 2019  (KR) .................. 10-2019-0109116
Jul. 27, 2020  (KR) .................. 10-2020-0093235

(51) Int. Cl.
*C09J 7/38* (2018.01)
*C09J 133/08* (2006.01)
*C09J 133/14* (2006.01)
*C08K 5/07* (2006.01)
*C08K 5/132* (2006.01)
*C08K 5/25* (2006.01)
*C09J 125/14* (2006.01)
*C09J 7/24* (2018.01)
*C09J 133/06* (2006.01)
*C08K 5/00* (2006.01)

(52) U.S. Cl.
CPC ............ *C09J 7/385* (2018.01); *C08K 5/0025* (2013.01); *C08K 5/07* (2013.01); *C08K 5/132* (2013.01); *C08K 5/25* (2013.01); *C09J 7/243* (2018.01); *C09J 125/14* (2013.01); *C09J 133/064* (2013.01); *C09J 133/066* (2013.01); *C09J 133/08* (2013.01); *C09J 133/14* (2013.01); *C08L 2205/025* (2013.01); *C09J 2203/334* (2013.01); *C09J 2301/302* (2020.08); *C09J 2301/408* (2020.08); *C09J 2400/28* (2013.01); *C09J 2423/106* (2013.01); *C09J 2433/00* (2013.01)

(58) Field of Classification Search
None
See application file for complete search history.

(56) References Cited

U.S. PATENT DOCUMENTS

| | | |
|---|---|---|
| 2006/0234074 A1 | 10/2006 | Yun et al. |
| 2010/0051200 A1 | 3/2010 | Mueller et al. |
| 2011/0043737 A1 | 2/2011 | Kim et al. |
| 2013/0048221 A1 | 2/2013 | Blackwell et al. |
| 2014/0242384 A1 | 8/2014 | Takashima et al. |
| 2017/0233619 A1 | 8/2017 | Nakada et al. |

FOREIGN PATENT DOCUMENTS

| | | |
|---|---|---|
| JP | 2008045048 A | 2/2008 |
| JP | 2019073640 A | 5/2019 |
| JP | 2019073641 A | 5/2019 |
| KR | 20060108515 A | 10/2006 |
| KR | 20090016241 A | 2/2009 |
| KR | 20090081001 A | 7/2009 |
| KR | 20100109373 A | 10/2010 |
| KR | 101019064 B1 | 3/2011 |
| KR | 20140067078 A | 6/2014 |
| KR | 20140079392 A | 6/2014 |
| KR | 101589486 B1 | 1/2016 |
| KR | 20170044101 A | 4/2017 |
| KR | 20180073333 A | 7/2018 |
| WO | 2006109993 A1 | 10/2006 |
| WO | 2015041403 A1 | 3/2015 |
| WO | 2015046872 A1 | 4/2015 |
| WO | 2018059954 A1 | 4/2018 |

OTHER PUBLICATIONS

Machine translation of WO 2015041403 A1 (Year: 2015).*
International Search Report for Application No. PCT/KR2020/010010 dated Nov. 11, 2020 pp. 1-4.
Extended European Search Report including Written Opinion for Application No. 20860055.1 dated Dec. 13, 2021, pp. 1-8.

* cited by examiner

Primary Examiner — Frank D Ducheneaux
(74) Attorney, Agent, or Firm — Lerner David LLP

(57) ABSTRACT

An acrylic emulsion pressure sensitive adhesive composition is provided. The acrylic emulsion pressure sensitive adhesive composition, due to pH-dependent properties, exhibits stable adhesion when attached to an adherend, but when it needs to be removed, it can be easily removed without residue using an alkaline solution. Thus, if the acrylic emulsion pressure sensitive adhesive composition is used as a pressure sensitive adhesive for a label of a plastic packaging article, the label can be easily removed during a recycling process, thus improving recycling efficiency.

12 Claims, No Drawings

ACRYLIC EMULSION PRESSURE SENSITIVE ADHESIVE COMPOSITION

CROSS-REFERENCE TO RELATED APPLICATION

The present application is a national stage entry under 35 U.S.C. § 371 of International Application No. PCT/KR2020/010010 filed on Jul. 29, 2020, which claims priority to Korean Patent Application No. 10-2019-0109116 filed on Sep. 3, 2019 and Korean Patent Application No. 10-2020-0093235 filed on Jul. 27, 2020 with the Korean Intellectual Property Office, the disclosures of which are herein incorporated by reference in their entirety.

TECHNICAL FIELD

The invention relates to an acrylic emulsion pressure sensitive adhesive composition.

BACKGROUND OF ART

A pressure-sensitive adhesive (PSA) is material that adheres to an adherend with a small pressure. It is viscoelastic material different from an adhesive, has basic properties of initial adhesion, adhesion, and cohesion, and is being used in various industrial fields such as printing, chemistry, medicine, household electrical appliances, automobiles, stationery, and the like.

A pressure-sensitive adhesive may be classified into acryl-based, rubber-based, silicon-based, EVA-based, and the like according to the monomers used, and classified into a solvent type, an emulsion type, a hot melt type, and the like according to the shape.

In the past, a rubber-based pressure-sensitive adhesive or a solvent type pressure-sensitive adhesive was mainly used for a pressure-sensitive adhesive tape and a pressure-sensitive adhesive label, and the like, but with the increase in demand for environmentally friendly pressure-sensitive adhesive, interest grew in non-solvent type pressure-sensitive adhesive, and technical development thereof was progressed. Currently, the use and production amount of non-solvent type pressure-sensitive adhesive significantly increased, and are expected to continuously increase in the future.

The non-solvent type pressure-sensitive adhesive is prepared representatively by aqueous emulsion polymerization, and it should exhibit sufficient adhesion when attached to an adherend, but should be easily peeled without residue when removed. Particularly, a pressure sensitive adhesive for a label used for a plastic packaging article such as a PET bottle should be easily removed in a recycling process so that the packaging article may be easily recycled. However, pressure sensitive adhesive for labels currently used for plastic packaging articles is not completely removed during a washing process using a heated dilute solution of caustic soda, and thus, has very low recycling efficiency.

DETAILED DESCRIPTION OF THE INVENTION

Technical Problem

It is an object of the invention to provide an acrylic emulsion pressure sensitive adhesive composition that exhibits stable adhesion when attached to an adherend, but can be easily removed using an alkaline solution when removed.

Technical Solution

In order to achieve the object, according to one embodiment of the invention, there is provided an acrylic emulsion pressure sensitive adhesive composition comprising a negatively charged first acrylic polymer, a positively charged second acrylic polymer, and a second external cross-linking agent, wherein a first external cross-linking agent is bonded to at least one of the first and second acrylic polymers, and the first external cross-linking agent is a keto group-containing monomer, and the second external cross-linking agent is a dihydrazide.

ADVANTAGEOUS EFFECTS

The acrylic emulsion pressure sensitive adhesive composition according to one embodiment of the invention, due to pH-dependent properties, exhibits stable adhesion when attached to an adherend, but when it needs to be removed, it can be easily removed without residue using an alkaline solution. Thus, if the acrylic emulsion pressure sensitive adhesive composition is used as a pressure sensitive adhesive for a label of a plastic packaging article, the label can be easily removed during a recycling process, thus improving recycling efficiency.

DETAILED DESCRIPTION OF THE EMBODIMENTS

Hereinafter, an acrylic emulsion pressure sensitive adhesive composition according to specific embodiments of the invention will be explained in detail.

According to one embodiment of the invention, there is provided an acrylic emulsion pressure sensitive adhesive composition comprising a negatively charged first acrylic polymer, a positively charged second acrylic polymer, and a second external cross-linking agent, wherein a first external cross-linking agent is bonded to at least one of the first and second acrylic polymers, and the first external cross-linking agent is a keto group-containing monomer, and the second external cross-linking agent is a dihydrazide.

The acrylic emulsion pressure sensitive adhesive composition may exhibit pH-dependent properties because negatively charged and positively charged acrylic polymers may bond with electrostatic attraction or debond according to pH. Thus, using the acrylic emulsion pressure sensitive adhesive composition, a pressure sensitive adhesive that exhibits sufficient adhesion when attached to an adherend, but can be easily removed using an alkaline solution when removed may be provided.

The first acrylic polymer may be negatively charged through repeating units derived from unsaturated carboxylic acid.

The unsaturated carboxylic acid may be, for example, one or more selected from the group consisting of (meth)acrylic acid, beta-carboxyethyl (meth)acrylate, crotonic acid, fumaric acid, and itaconic acid.

The repeating units derived from unsaturated carboxylic acid may be included in the content of 1 to 10 mol %, 1 to 7 mol %, or 1 to 5 mol %, based on the total repeating units except the first external cross-linking agent. Wherein, the total repeating units except the first external cross-linking agent mean repeating units except the repeating units derived from the first external cross-linking agent, among the total repeating units constituting the first acrylic polymers. If the repeating units derived from unsaturated carboxylic acid are included in the above range, a pressure sensitive adhesive that exhibits excellent adhesion but can be easily removed using an alkaline solution according to pH may be provided.

The first acrylic polymer may further comprise repeating units derived from alkyl (meth)acrylate; and repeating units derived from comonomers selected from the group consisting of vinyl monomers and hydroxyl group-containing (meth)acrylate, in addition to the repeating units derived from unsaturated carboxylic acid.

The alkyl (meth)acrylate may be, for example, one or more selected from the group consisting of methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, decyl (meth)acrylate, isodecyl(meth)acrylate, dodecyl (meth)acrylate and isobornyl (meth)acrylate.

The repeating units derived from alkyl (meth)acrylate may be included in the content of 70 to 95 mol % or 80 to 90 mol %, based on the total repeating units except the first external cross-linking agent. Within such ranges, sufficient initial adhesion may be secured, and when the pressure sensitive adhesive is removed, it can be easily peeled from the adherend without residue.

The vinyl-based monomers may be, for example, one or more selected from the group consisting of styrene, methylstyrene, ethylstyrene, butylstyrene, chlorostyrene, vinylnaphthalene, chloromethylstyrene, hydroxymethylstyrene, divinylbenzene and vinyl acetate.

The hydroxyl group-containing (meth)acrylate may be, for example, one or more selected from the group consisting of hydroxymethyl (meth)acrylate, hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxylauryl (meth)acrylate, hydroxyethyleneglycol (meth)acrylate and hydroxypropyleneglycol (meth)acrylate.

The repeating units derived from comonomers selected from the group consisting of vinyl monomers and hydroxyl group-containing (meth)acrylate may be included in the content of 1 to 20 mol % or 4 to 15 mol %, based on the total repeating units except the first external cross-linking agent. Within such ranges, appropriate flexibility may be exhibited, thus realizing stable adhesion property.

For example, the first acrylic polymer may comprise repeating units derived from unsaturated carboxylic acid; repeating units derived from alkyl (meth)acrylate; and repeating units derived from vinyl-based monomers.

Particularly, the first acrylic polymer may comprises repeating units derived from (meth)acrylic acid, as the repeating units derived from unsaturated carboxylic acid; repeating units derived from methyl (meth)acrylate and 2-ethylhexyl (meth)acrylate, as the repeating units derived from alkyl (meth)acrylate; and repeating units derived from styrene and vinyl acetate, as the repeating units derived from vinyl-based monomers, thereby providing a pressure sensitive adhesive that not only exhibits more excellent adhesion, but also can be easily peeled.

Meanwhile, the second acrylic polymer may be positively charged through repeating units derived from amino group-containing (meth)acrylate.

The amino group-containing (meth)acrylate may be, for example, one or more selected from the group consisting of dimethyl aminomethyl (meth)acrylate, dimethyl aminoethyl (meth)acrylate, dimethyl aminopropyl (meth)acrylate, dimethyl aminobutyl (meth)acrylate and dimethyl aminohexyl (meth)acrylate.

The repeating units derived from amino group-containing (meth)acrylate may be included in the content of 1 to 15 mol %, 5 to 12 mol % or 8 to 12 mol %, based on the total repeating units except the first external cross-linking agent. Wherein the total repeating units except the first external cross-linking agent mean repeating units except the repeating units derived from the first external cross-linking agent, among the total repeating units constituting the second acrylic polymer. If the repeating units derived from amino group-containing (meth)acrylate are included in the above range, a pressure sensitive adhesive that not only exhibits excellent adhesion, but also can be easily peeled using an alkaline solution according to pH may be provided.

The second acrylic polymer, like the first acrylic polymer, may further comprise repeating units derived from alkyl (meth)acrylate; and repeating units derived from comonomers selected from the group consisting of vinyl-based monomers and hydroxyl group-containing (meth)acrylate, in addition to the repeating units derived from amino group-containing (meth)acrylate. For specific kinds and contents of the alkyl (meth)acrylate, vinyl-based monomers, and hydroxyl group-containing (meth)acrylate, the above explanations regarding the first acrylic polymer may be referred to.

For example, the second acrylic polymer may comprise repeating units derived from amino group-containing (meth)acrylate; repeating units derived from alkyl (meth)acrylate; and repeating units derived from vinyl-based monomers.

Particularly, the second acrylic polymer may comprise repeating units derived from dimethyl aminoethyl (meth)acrylate, as the repeating units derived from amino group-containing (meth)acrylate; repeating units derived from methyl (meth)acrylate and 2-ethylhexyl (meth)acrylate, as the repeating units derived from alkyl (meth)acrylate; and repeating units derived from styrene, as the repeating units derived from vinyl-based monomers, thereby providing a pressure sensitive adhesive that not only exhibits more excellent adhesion, but also can be easily peeled.

The first and second acrylic polymers may be included at a weight ratio of 9.9:0.1 to 0.1:9.9, 9.5:0.5 to 0.5:9.5, 9:1 to 1:9, 9:1 to 5:5 or 9:1 to 8:2, thus realizing the above explained properties.

Particularly, in case the first acrylic polymer comprises the repeating units derived from unsaturated carboxylic acid in the content of 1 to 7 mol% or 1 to 5 mol %, based on the total repeating units except the first external cross-linking agent, and the second acrylic polymer comprises the repeating units derived from amino group-containing (meth)acrylate in the content of 8 to 12 mol %, based on the total repeating units except the first external cross-linking agent, the first and second acrylic polymer may be mixed at a weight ratio of 9:1 to 5:5 or 9:1 to 8:2, thereby providing a pressure sensitive adhesive having more excellent adhesion.

Since the first and second acrylic polymers are negatively charged and positively charged, respectively, pH-dependent properties may be exhibited. However, as the results of studies of the inventors, it was confirmed that in case the first and second acrylic polymers are cross-linked by cross-linking agents other than the first and second external cross-linking agents, such as an isocyanate-based cross-linking agent, pH dependent properties may not be exhibited.

The first external cross-linking agent is a keto group-containing monomer and is bonded to at least one of the first and second acrylic polymers, and during the storage of the acrylic emulsion pressure sensitive adhesive composition or while coating and drying the acrylic emulsion pressure sensitive adhesive composition to provide a pressure sensitive adhesive, the keto group of the first external cross-linking agent and the hydrazide of the second external cross-linking agent form a crosslink structure. Thus, in the acrylic emulsion pressure sensitive adhesive composition, the second external cross-linking agent may be chemically bonded or may not be bonded.

For example, the first external cross-linking agent may be bonded to the first acrylic polymer, and the first external cross-linking agent may be also bonded to the second acrylic polymer.

Meanwhile, the first external cross-linking agent may be added at the beginning, middle or end of polymerization of acrylic polymers, and bonded to the acrylic polymers. For example, it may be added at the middle or end of polymerization of acrylic polymers, and bonded on the surface of the acrylic polymers so as to be favorable for the formation of an external crosslink structure.

The first external cross-linking agent may be, for example, one or more keto group-containing monomers selected from the group consisting of diacetone (meth) acrylamide, diacetone (meth)acrylate and acetoacetoxyalkyl (meth)acrylate. In the acetoacetoxyalkyl (meth)acrylate, the alkyl group may be an alkyl group having a carbon number of 1 to 10.

The first external cross-linking agent may be bonded at 0.1 to 3 moles or 0.1 to 1 moles per 100 moles of the total repeating units except the first external cross-linking agent of the first or second acrylic polymer. The total repeating units except the first external cross-linking agent of the first or second acrylic polymer, in case the first external cross-linking agent is bonded to the first or second acrylic polymer, mean repeating units except the repeating units derived from the first external cross-linking agent, among the total repeating units constituting the first or second acrylic polymer. By bonding the first external cross-linking agent within the above range, an acrylic emulsion pressure sensitive adhesive composition that exhibits improved cohesion, and can be easily removed without residue using an alkaline solution may be provided.

The second external cross-linking agent may be, for example, one or more dihydrazide selected from the group consisting of oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanedioic acid dihydrazide, phthalic acid dihydrazide, isophthalic acid dihydrazide, terephthalic acid dihydrazide, 2,6-naphthalene dicarboxylic acid dihydrazide, naphthalic acid dihydrazide, acetonedicarboxylic acid dihydrazide, fumaric acid dihydrazide, maleic acid dihydrazide, itaconic acid dihydrazide, trimellitic acid dihydrazide, 1,3,5-benzenetricarboxylic acid dihydrazide, pyromellitic acid dihydrazide and aconitic acid dihydrazide.

The second external cross-linking agent may be included at 0.2 to 1 equivalents, or 0.4 to 1 equivalent, based on 1 equivalent of the first external cross-linking agent, thus providing an acrylic emulsion pressure sensitive adhesive composition that exhibits improved cohesion, and can be easily removed without residue using an alkaline solution.

The first and second acrylic polymers may be prepared by emulsion polymerization.

For example, acrylic polymer may be prepared by dispersing an emulsifier in a solvent to prepare an emulsified liquid; mixing a monomer mixture and an emulsifier to prepare a pre-emulsion; and mixing the emulsified liquid and the pre-emulsion and progressing emulsion polymerization in the presence of a polymerization initiator.

In the step of preparing the emulsified liquid, the emulsifier may be mixed with a solvent such as water, and the temperature may be raised to 40° C. to 90° C. so as to remove oxygen.

The emulsifier is used for the production of initial particles, control of the size of produced particles, and stability of the particles, during polymerization. As the emulsifier, for example, one or more selected from the group consisting of an anionic emulsifier, a cationic emulsifier and a non-ionic emulsifier may be used. In emulsion polymerization, an anionic emulsifier or a non-ionic emulsifier is mainly used, and they are frequently used in combination so as to compensate mechanical and chemical stabilities.

As the anionic emulsifier, for example, one or more selected from the group consisting of sodium alkyl diphenyl ether disulfonate, sodium polyoxyethylene alkyl ether sulfate, sodium polyoxyethylene aryl ether sulfate, sodium alkyl sulfate, sodium alkyl benzene sulfonate and dialkyl sodium sulfosuccinate may be used. As the non-ionic emulsifier, for example, one or more selected from the group consisting of polyethyleneoxide alkyl aryl ether, polyethyleneoxide alkyl amine, and polyethyleneoxide alkyl ester may be used. And, as the emulsifier, commercially available Disponil FES77 (product from BASF) and/or Dowfax 2A1 (product from Dow Chemical), and the like may be used.

The emulsifier may be used in the content of 0.01 to 10 parts by weight or 0.1 to 5 parts by weight, based on 100 parts by weight of the monomer mixture.

Meanwhile, apart from the step of preparing the emulsified liquid, a monomer mixture and an emulsifier are mixed with a solvent such as water to prepare a pre-emulsion.

The monomer mixture may be prepared by mixing the above explained monomers according to polymer to be prepared (namely, according to the kinds of the first and second acrylic polymers). As the emulsifier mixed with the monomer mixture, all the emulsifiers that can be used in the step of preparing an emulsifier liquid as explained above may be used. In the step of preparing a pre-emulsion, nanosized latex particles may be formed.

When the emulsified liquid and the pre-emulsion are prepared, the emulsifier liquid and the pre-emulsion may be mixed in the presence of a polymerization initiator for emulsion polymerization.

As non-limiting examples, the polymerization initiator may be introduced into an oxygen-removed emulsified liquid, and may be continuously introduced into the emulsified liquid for a predetermined time, together with the pre-emulsion, at the equivalent rate.

Wherein, as the polymerization initiator, inorganic or organic peroxide may be used. Specifically, as the polymerization initiator, water-soluble polymerization initiators such as potassium persulfate, sodium persulfate, ammonium persulfate, and the like, or oil-soluble polymerization initiators such as cumene hydroperoxide, benzoyl peroxide, and the like may be used. In order to accelerate reaction initiation of peroxide, an activator may be additionally used. Specifically, as the activator, one or more selected from the group consisting of sodium formaldehyde sulfoxylate, sodium ethylenediamine tetraacetate, ferrous sulfate, and dextrose may be used.

The polymerization initiator may be used in the content of about 0.1 to about 10 parts by weight or about 0.1 to about 5 parts by weight, based on 100 parts by weight of the monomer mixture, on the basis of dry weight.

In the emulsion polymerization reaction of the acrylic polymers, an electrolyte may be additionally used to control pH and give polymerization stability. As non-limiting examples of the electrolyte, one or more selected from the group consisting of sodium hydroxide, sodium bicarbonate, sodium carbonate, sodium phosphate, sodium sulfate and sodium chloride may be mentioned.

The temperature and time of the emulsion polymerization reaction may be appropriately controlled according to circumstances. For example, the polymerization temperature may be about 0° C. to about 200° C., about 30° C. to about 100° C., about 40° C. to about 90° C. or about 50° C. to about 90° C., and the polymerization time may be about 0.5 hours to about 20 hours, about 0.5 hours to about 10 hours, about 0.5 hours to about 5 hours, or about 0.5 hours to about 2 hours.

In the emulsion polymerization of the acrylic polymers, the first external cross-linking agent may be added at the beginning, middle or end of the polymerization of acrylic polymers, as explained above. Specifically, in case the first external cross-linking agent is added at the beginning of the polymerization of acrylic polymer, it may be added when preparing a monomer mixture in the step of preparing a pre-emulsion, and in case it is added at the middle of the polymerization of acrylic polymer, it may be added when continuously introducing a monomer mixture, and in case it is added at the end of the polymerization of acrylic polymer, it may be added after all the monomer mixture is introduced. The first external cross-linking agent may be introduced one or more times, and it may be introduced one or more times of the beginning, middle and end of polymerization.

When negatively charged first acrylic polymer and positively charged second acrylic polymer are prepared through the above explained emulsion polymerization reaction, they may be mixed at desired ratio, and an acidic or alkaline aqueous solution may be added to control pH. Thereafter, the second external cross-linking agent may be introduced therein, thus providing the acrylic emulsion pressure sensitive adhesive composition according to one embodiment. The acrylic emulsion pressure sensitive adhesive composition may comprise, besides the above explained components, other additives without specific limitations, in a range within which the aimed effects are not deteriorated.

Meanwhile, according to another embodiment of the invention, there is provided a pressure sensitive adhesive comprising a substrate: a pressure sensitive adhesive layer formed by coating the acrylic emulsion pressure sensitive adhesive composition on at least one side of the substrate. The substrate may be all substrates used in the art, and as a method for forming a pressure sensitive adhesive layer using the acrylic emulsion pressure sensitive adhesive composition, any methods used in the art may be used.

Hereinafter, the actions and effects of the invention will be explained in more detail through examples. However, these examples are presented only as the illustrations of the invention, and the scope of the right of the invention is not limited thereby.

Preparation Example 1: Preparation of Acrylic Polymer

Into a glass reactor having a capacity of 3 L equipped with a thermometer, a stirrer, a dropping funnel, a nitrogen gas injection pipe and a reflux condenser, 110 g of water, and as an emulsifier, 1 g of Disponil FES77 (product from BASF, 30 wt % aqueous solution of sodium salt of sulfuric acid monoester of $C_{12}$~$C_{14}$-alkyl group ethoxylated with 30 ethylene oxide units) and 0.25 g of Dowfax 2A1 (product from Dow Chemical, 45 wt % aqueous solution of sodium salt of diphenyl ether modified with $C_{12}$~$C_{14}$-alkyl radical and $2SO_3K$ radicals) were introduced and stirred. The inside of the reactor was replaced with nitrogen, and then, under nitrogen atmosphere, the temperature was raised to 80° C., which was maintained for 60 minutes.

Separately, into a 2 L beaker, 480.0 g of 2-ethylhexyl acrylate, 60.0 g of methyl methacrylate, 30.0 g of vinyl acetate, 12.0 g of styrene, and 6.0 g of acrylic acid were introduced, and then, stirred for 30 minutes to prepare a monomer mixture. Into the monomer mixture, a solution consisting of 25 g of a 26 wt % aqueous solution of sodium polyoxyethylene lauryl ether sulfate, 5 g of a 45 wt % aqueous solution of sodium alkyl diphenyl ether disulfonate, 2 g of sodium carbonate, and 130 g of water were introduced, and stirred to prepare an opaque pre-emulsion.

Into the glass reactor, 6 g of a 5 wt % aqueous solution of ammonium persulfate was introduced, and stirred for 10 minutes to dissolve.

Into the glass reactor, the pre-emulsion and 60 g of a 5 wt % aqueous solution of ammonium persulfate were evenly continuously introduced for 5 hours, and after 4 hours, 4 g of diacetone acrylamide was added as a first external cross-linking agent.

After the pre-emulsion, initiator and first external cross-linking agent were completely introduced, the temperature of the glass reactor was raised to 80° C., and the temperature was maintained for 1 hour to prepare acrylic polymer.

Preparation Examples 2 to 4: Preparation of Acrylic Polymer

Acrylic polymer was prepared by the same method as Preparation Example 1, except that the kind and content of the monomers were changed as described in the following Table 1.

TABLE 1

|  | Preparation Example 1 | Preparation Example 2 | Preparation Example 3 | Preparation Example 4 |
| --- | --- | --- | --- | --- |
| 2-EHA | 480.0 (2.61, 69.44%) | 516.0 (2.80, 74.57%) | 510.0 (2.77, 77.16%) | 456.0 (2.47, 67.09%) |
| MMA | 60.0 (0.60, 15.98%) | 24.0 (0.24, 6.38%) | 42.0 (0.42, 11.69%) | 66.0 (0.66, 17.87%) |
| VAc | 30.0 (0.35, 9.29%) | 24.0 (0.28, 7.42%) | 18.0 (0.21, 5.83%) |  |
| SM | 12.0 (0.12, 3.07%) |  |  | 18.0 (0.17, 4.69%) |
| HEA |  | 12.0 (0.10, 2.75%) |  |  |
| AA | 6.0 (0.08, 2.22%) | 24.0 (0.33, 8.87%) |  |  |

TABLE 1-continued

|  | Preparation Example 1 | Preparation Example 2 | Preparation Example 3 | Preparation Example 4 |
|---|---|---|---|---|
| DMAEMA |  |  | 30.0 (0.19, 5.32%) | 60.0 (0.38, 10.35%) |

(units outside parenthesis: g, units in parenthesis: mol, mol %)
* 2-EHA: 2-ethylhexyl acrylate
MMA: methyl methacrylate
VAc: vinyl acetate
SM: styrene
HEA: hydroxyethyl acrylate
AA: acrylic acid
DMAEMA: dimethyl aminoethyl methacrylate

Example 1: Preparation of an Acrylic Emulsion Pressure Sensitive Adhesive Composition The acrylic polymer prepared in Preparation Example 1 and the acrylic polymer prepared in Preparation Example 4 were mixed at a weight ratio of 9:1, a 10 wt % sodium hydroxide aqueous solution was added to control the pH to 5 to 7, and then, 2 g of adipic acid dihydrazide was added as the second external cross-linking agent to prepare an acrylic emulsion pressure sensitive adhesive composition.

Examples 2 to 4 and Comparative Examples 1 to 4: Preparation of Acrylic Emulsion Pressure Sensitive Adhesive Compositions Acrylic emulsion pressure sensitive adhesive compositions were prepared by the same method as Example 1, except that the kind and mixing rate of the acrylic polymers were changed as described in the following Table 2.

TABLE 2

|  | Preparation Example 1 | Preparation Example 2 | Preparation Example 3 | Preparation Example 4 |
|---|---|---|---|---|
| Example 1 | 9 |  |  | 1 |
| Example 2 | 8 |  |  | 2 |
| Example 3 |  | 5 | 5 |  |
| Example 4 |  | 8 | 2 |  |
| Comparative Example 1 | 10 |  |  |  |
| Comparative Example 2 |  |  |  | 10 |
| Comparative Example 3 |  | 10 |  |  |
| Comparative Example 4 |  |  | 10 |  |

(unit: weight ratio)

The acrylic emulsion pressure sensitive adhesive composition of Comparative Example 1 comprising only the acrylic polymer prepared in Preparation Example 1 had gel content of 58.5%, and the acrylic emulsion pressure sensitive adhesive composition of Comparative Example 2 comprising only the acrylic polymer prepared in Preparation Example 4 had gel content of 41.0%, while the acrylic emulsion pressure sensitive adhesive compositions of Examples 1 and 2 comprising the acrylic polymer prepared in Preparation Example 1 and the acrylic polymer prepared in Preparation Example 4 had gel contents of 60.2% and 62.1%, respectively. Thus, it is confirmed that in the acrylic emulsion pressure sensitive adhesive compositions of Examples 1 and 2, negatively charged first acrylic polymer and positively charged second acrylic polymer are sufficiently bonded through electrostatic attraction.

Comparative Example 5: Preparation of an Acrylic Emulsion Pressure Sensitive Adhesive Composition Negatively charged acrylic polymer was prepared by the same method as Preparation Example 2, except that the first external cross-linking agent was not used in Preparation Example 2, and positively charged acrylic polymer was prepared by the same method as Preparation Example 3, except that the first external cross-linking agent was not used in Preparation Example 3. And, the negatively charged acrylic polymer and positively charged acrylic polymer were mixed at a weight ratio of 8:2, and then, 3 g of a polyisocyanate-based cross-linking agent consisting of an adduct of xylene diisocyanate with trimethylolpropane was added to prepare an acrylic emulsion pressure sensitive adhesive composition.

Experimental Example: Property Evaluation of Acrylic Emulsion Pressure Sensitive Adhesive Compositions Preparation of an Adhesion Member The above prepared acrylic emulsion pressure sensitive adhesive composition was coated on a release paper to a thickness of 20 μm, dried at 120° C. for 1 minute, and then, laminated to a polypropylene film to prepare an adhesion member. However, in the case of the acrylic emulsion pressure sensitive adhesive composition of Comparative Example 5, it was dried at 150° C. for 3 minutes to prepare an adhesion member. For the prepared adhesion members, properties were measured as follows.

Measurement of Adhesion Properties 1) 90 Degree Peel Strength

For the above prepared adhesion member, 90 degree peel strength was measured according to FTM 2 of FINAT test method, wherein a specimen of 1 inch×20 cm was prepared, and attached on a stainless steel plate (SUS), and then, a 2 kg roller was made to go back and forth at a speed of 300 mm/min twice to compress. After aging at room temperature for 20 minutes, 90 degree peel strength was measured using TA Texture Analyzer while peeling at a speed of 300 mm/min for 5 seconds.

2) Evaluation of Label Peel

The above prepared adhesion member was attached to a PET bottle, and then, the PET bottle was ground to 6 to 8 mm. 10 ground PET flakes were put into a 2 wt % sodium hydroxide aqueous solution heated to 80 to 90° C., and then, stirred for 5 minutes. And then, they were filtered using a sieve, and washed, and then, it was confirmed whether or not the adhesion member was peeled from the PET flakes, and whether or not adhesive residue remained on the PET flakes from which the adhesion member had been peeled, and label peel was evaluated according to the following standard.

Evaluation Standard of Label Peel

◯: Adhesion member was peeled from 8 or more PET flakes among 10 PET flakes, and by observation with the unaided eye, adhesive residue was not detected in the PET flakes.

Δ: Adhesion member was peeled from 5 or more PET flakes among 10 PET flakes, and by observation with the unaided eye, adhesive residue was not detected in the PET flakes.

X: Adhesion member was peeled from less than 5 PET flakes among 10 PET flakes, and by observation with the unaided eye, adhesive residue was detected in the PET flakes.

Using the adhesion members prepared from the acrylic emulsion pressure sensitive adhesive compositions prepared in Examples 1 to 4 and Comparative Examples 1 to 5, pressure sensitive adhesion properties were evaluated, and the results were shown in the following Tables 3 and 4.

TABLE 3

| | Mixing ratio of the acrylic polymers of Preparation Examples 1 and 4 | 90 degree peel strength (N/in) | Evaluation of label peel |
|---|---|---|---|
| Example 1 | 9:1 | 8.5 | ○ |
| Example 2 | 8:1 | 9.2 | ○ |
| Comparative Example 1 | 10:0 | 7.4 | X |
| Comparative Example 2 | 0:10 | 6.7 | X |

The Table 3 shows the evaluation results of adhesion and easy peel of the acrylic emulsion pressure sensitive adhesive compositions prepared by adding a second external cross-linking agent to a solution comprising the acrylic polymers prepared in Preparation Example 1 and 4 or to a solution comprising one of the acrylic polymers alone.

Referring to Table 3, it is confirmed that since the acrylic emulsion pressure sensitive adhesive compositions according to one embodiment of the invention comprise negatively charged acrylic polymer and positively charged acrylic polymer, they not only exhibit excellent adhesion property by the electrostatic attraction of negatively charged and positively charged functional groups, and but also can be easily peeled using a weak alkaline solution.

TABLE 4

| | Mixing ratio of the acrylic polymers of Preparation Example 2 and 3 | Second external cross-linking agent | 90 degree peel strength (N/in) | Evaluation of label peel |
|---|---|---|---|---|
| Example 3 | 5:5 | Adipic acid dihydrazide | 5.1 | ○ |
| Example 4 | 8:2 | Adipic acid dihydrazide | 4.4 | ○ |
| Comparative Example 3 | 10:0 | Adipic acid dihydrazide | 3.4 | Δ |
| Comparative Example 4 | 0:10 | Adipic acid dihydrazide | 4.2 | Δ |
| Comparative Example 5 | 8:2* | Polyisocyanate cross-linking agent | 4.1 | Δ |

*When preparing the negatively charged acrylic polymer and positively charged acrylic polymer of Comparative Example 5, the first external cross-linking agent was not used, and thus, in the acrylic polymers of Comparative Example 5, repeating units derived from the first external cross-linking agent (diacetone acrylamide) are not included.

The Table 4 shows the evaluation results of adhesion and easy peel of the acrylic emulsion pressure sensitive adhesive compositions(Example 3, 4, Comparative Example 3 and 4) prepared by adding a second external cross-linking agent to a solution comprising the acrylic polymers prepared in Preparation Example 2 and 3 or to a solution comprising one of the acrylic polymers alone, and the acrylic emulsion pressure sensitive adhesive composition(Comparative Example 5) prepared using the acrylic polymers prepared in Preparation Example 2 and 3, but using a polyisocyanate-based cross-linking agent instead of the first and second external cross-linking agent.

Like the results of Table 3, it is confirmed that in Examples 3 and 4, even if acrylic polymers different from Examples 1 and 2 were used, compared to the cases of using negatively charged acrylic polymer or positively charged acrylic polymer alone, they exhibit excellent adhesion property and can be easily peeled using a weak alkaline solution.

Thus, it is confirmed that the negatively charged acrylic polymer and positively charged acrylic polymer according to one embodiment of the invention form a crosslink structure by the first and second external cross-linking agent, thereby exhibiting pH-dependent adhesion and peeling properties.

The invention claimed is:

1. An acrylic emulsion pressure sensitive adhesive composition comprising:
    a first acrylic polymer, wherein the first acrylic polymer is negatively charged;
    a second acrylic polymer, wherein the second acrylic polymer is positively charged;
    a first external cross-linking agent; and
    a second external cross-linking agent,
    wherein the first external cross-linking agent is bonded to at least one of the first acrylic polymer or the second acrylic polymer,
    wherein the first external cross-linking agent is a keto group-containing monomer, and the second external cross-linking agent is a dihydrazide,
    wherein the second acrylic polymer comprises repeating units derived from alkyl (meth)acrylate; repeating units derived from comonomers selected from the group consisting of a vinyl-based monomer and a hydroxyl group-containing (meth)acrylate; and repeating units derived from an amino group-containing (meth)acrylate,
    wherein the vinyl-based monomer is one or more selected from the group consisting of styrene, methylstyrene, ethylstyrene, butylstyrene, chlorostyrene, vinylnaphthalene, chloromethylstyrene, hydroxymethylstyrene, divinylbenzene and vinyl acetate, and
    wherein the second acrylic polymer is positively charged through the repeating units derived from the amino group-containing (meth)acrylate, and the repeating units derived from the amino group-containing (meth)acrylate are included in a content of 5 to 12 mol %, based on total repeating units of the second acrylic polymer.

2. The acrylic emulsion pressure sensitive adhesive composition according to claim 1, wherein the first acrylic polymer is negatively charged through repeating units derived from unsaturated carboxylic acid, and the repeating units derived from the unsaturated carboxylic acid are included in an amount of 1 to 10 mol %, based on total repeating units of the first acrylic polymer.

3. The acrylic emulsion pressure sensitive adhesive composition according to claim 1, wherein the first acrylic polymer comprises repeating units derived from alkyl (meth)acrylate; repeating units derived from comonomers selected from the group consisting of vinyl monomers and hydroxyl group-containing (meth)acrylate; and repeating units derived from unsaturated carboxylic acid.

4. The acrylic emulsion pressure sensitive adhesive composition according to claim 1, wherein the first acrylic polymer comprises repeating units derived from methyl (meth)acrylate and 2-ethylhexyl (meth)acrylate; repeating units derived from styrene and vinyl acetate; and repeating units derived from (meth)acrylic acid.

5. The acrylic emulsion pressure sensitive adhesive composition according to claim 1, wherein the second acrylic polymer comprises repeating units derived from methyl (meth)acrylate and 2-ethylhexyl (meth)acrylate; repeating units derived from styrene; and repeating units derived from dimethyl aminoethyl (meth) acrylate.

6. The acrylic emulsion pressure sensitive adhesive composition according to claim 1, wherein the first acrylic polymer and the second acrylic polymer are included at a weight ratio of 9.9:0.1 to 0.1:9.9.

7. The acrylic emulsion pressure sensitive adhesive composition according to claim 1, wherein the first acrylic polymer comprises repeating units derived from unsaturated carboxylic acid in an amount of 1 to 7 mol % based on total repeating units of the first acrylic polymer, the second acrylic polymer comprises the repeating units derived from the amino group-containing (meth)acrylate in an amount of 8 to 12 mol % based on total repeating units of the second acrylic polymer, and the first acrylic polymer and the second acrylic polymer are included at a weight ratio of 9:1 to 8:2.

8. The acrylic emulsion pressure sensitive adhesive composition according to claim 1, wherein the first external cross-linking agent is one or more keto group-containing monomers selected from the group consisting of diacetone (meth)acrylamide, diacetone (meth)acrylate, and acetoacetoxyalkyl (meth)acrylate.

9. The acrylic emulsion pressure sensitive adhesive composition according to claim 1, wherein the second external cross-linking agent is one or more dihydrazide selected from the group consisting of oxalic acid dihydrazide, malonic acid dihydrazide, succinic acid dihydrazide, glutaric acid dihydrazide, adipic acid dihydrazide, pimelic acid dihydrazide, suberic acid dihydrazide, azelaic acid dihydrazide, sebacic acid dihydrazide, dodecanedioic acid dihydrazide, phthalic acid dihydrazide, isophthalic acid dihydrazide, terephthalic acid dihydrazide, 2,6-naphthalene dicarboxylic acid dihydrazide, naphthalic acid dihydrazide, acetonedicarboxylic acid dihydrazide, fumaric acid dihydrazide, maleic acid dihydrazide, itaconic acid dihydrazide, trimellitic acid dihydrazide, 1,3,5-benzenetricarboxylic acid dihydrazide, pyromellitic acid dihydrazide and aconitic acid dihydrazide.

10. The acrylic emulsion pressure sensitive adhesive composition according to claim 1, wherein the first external cross-linking agent is bonded in an amount of 0.1 to 1 mole, based on 100 moles of total repeating units of the first acrylic polymer or the second acrylic polymer.

11. The acrylic emulsion pressure sensitive adhesive composition according to claim 1, wherein the second external cross-linking agent is included at 0.2 to 1 equivalent, based on 1 equivalent of the first external cross-linking agent.

12. A pressure sensitive adhesive comprising a substrate; a pressure sensitive adhesive layer, wherein the pressure sensitive layer is formed by coating the acrylic emulsion pressure sensitive adhesive composition according to claim 1 on at least one side of the substrate.

* * * * *